United States Patent [19]
Brühl

[11] Patent Number: 5,531,426
[45] Date of Patent: Jul. 2, 1996

[54] HYDRAULIC SUPPORT

[75] Inventor: Hubert Brühl, Waldstetten, Germany

[73] Assignee: Mercedes-Benz AG, Stuttgart, Germany

[21] Appl. No.: 544,165

[22] Filed: Oct. 17, 1995

[30]     Foreign Application Priority Data

Oct. 31, 1994 [DE]  Germany ............... 44 38 932.9

[51] Int. Cl.$^6$ ............... F16F 13/00; F16F 13/14
[52] U.S. Cl. ............... 267/140.12; 267/140.13; 267/140.5; 267/220
[58] Field of Search ............ 267/140.11–140.15, 267/140.5, 219, 220; 180/300, 312, 902; 248/562, 636, 638, 583; 280/716, 710

[56]         References Cited

U.S. PATENT DOCUMENTS 5,088,704  2/1992  Kanda ........................... 267/220
5,102,108  4/1992  Fujinami et al. ............... 267/140.12
5,172,893  12/1992 Bouhier et al. ................ 267/140.11
5,386,973  2/1995  Brenner et al. ................ 267/140.5

FOREIGN PATENT DOCUMENTS

0452169A1  10/1991  European Pat. Off. .
3722132A1   1/1989  Germany .
4106451A1   9/1991  Germany .
4117128A1  11/1992  Germany .

Primary Examiner—Douglas C. Butler
Attorney, Agent, or Firm—Evenson McKeown Edwards & Lenahan

[57]             ABSTRACT

A hydraulic support in the form of a hydraulically damped elastomer support is disclosed. The hydraulic chambers of the support are arranged and designed in such a way that effective damping is achieved both in the case of vibrations in the longitudinal direction and vibrations in the transverse direction and that all the chambers can contribute to dynamic support in the transverse direction.

19 Claims, 6 Drawing Sheets

HYDRAULIC SUPPORT

BACKGROUND AND SUMMARY OF THE INVENTION

The invention relates to a hydraulic support in the form of a hydraulically damped elastomer support with an inner supporting part and an outer supporting part, concentric with the latter, and an annular elastomer body which is arranged as a spring between these supporting parts and in which there are formed hydraulic chambers which communicate with one another via hydraulic restrictor sections and between which hydraulic medium is exchanged when the supporting parts move relative to one another in the axial or radial direction. There preferably are at least two groups of chambers, which are spaced apart in the circumferential direction of the supporting parts and which each have at least two chambers situated adjacent to one another in the axial direction. The restrictor sections connect the chambers of each group to one another and in each case connect one chamber of each group to the corresponding chamber of another group.

A hydraulic support of this kind is the subject matter of German Patent Document DE 41 17 128 A1. There, the elastomer body is arranged between the outer supporting part, which is designed as a sheet-metal part, and an intermediate sleeve, which likewise consists of sheet metal and which, for its part, forms a seal directly on the inner supporting part and is held axially secured. The restrictor sections can be arranged as channels in the elastomer body and/or between the intermediate sleeve and the inner supporting part, which for this purpose is provided on its outer circumference with corresponding grooves or the like which communicate via openings in the intermediate sleeve with the hydraulic chambers recessed into the elastomer body.

In the case of this known hydraulic support, it is, on the one hand, possible for the cross-section of the restrictor sections arranged in the elastomer body and hence the restriction provided by them to vary. On the other hand, sealing problems can arise with the restrictor sections arranged between the intermediate sleeve and the inner supporting part.

One advantage of this known hydraulic support consists in the fact that, in the case of radial and axial relative movements between the outer and the inner supporting part, hydraulic medium is exchanged between different chambers and hence via different restrictor sections, which can be differently tuned in order to effect stronger damping in the radial or axial direction, at different vibration frequencies if required.

In order to achieve a greater displacement of hydraulic medium in the case of axial relative movements between the supporting parts too, the proposal of German Patent Document DE 41 71 128 A1 is that each group of chambers should have a chamber which is arranged between a tapered inner circumferential region of the outer supporting part and the tapered outer circumference of a shaped plate arranged on the inner supporting part. In the case of axial relative movements between the outer and the inner supporting part, the axial spacing between the tapered inner circumferential region and the opposing tapered outer circumferential surface changes.

A functionally similar hydraulic support is the subject-matter of German Patent Document EP 04 52 169 A1. Here, the supporting parts are designed as mutually concentric sleeve parts, one end of each of which is provided with a flange. Arranged within the elastomer body which fills the clearance between the flanges and the sleeve parts there is a first annular chamber between the flanges and a second annular chamber in the region of the sleeve ends remote from the flanges, the second annular chamber communicating with the first annular chamber via an axial channel formed in the inner supporting part. Arranged axially between the two annular chambers, between the sleeve parts, there are two chambers which are situated diametrically opposite one another and are connected to one another via another channel formed in the inner supporting part. The two latter chambers can furthermore be connected to the annular chambers via additional channels.

German Patent Document DE 37 22 132 A1 discloses a further hydraulic support, the elastomer body of which is arranged between the outer supporting part and an inner sleeve held in a sealing manner on the inner supporting part. This hydraulic support has just two hydraulic chambers, which are accommodated in recesses in the outer circumference of the inner supporting part and directly adjoin the elastomer body in the radially outward direction since the inner sleeve has apertures in the region of the above-mentioned depressions. A restrictor section connecting the two chambers can be formed as a transverse hole in the inner supporting part or between the inner sleeve and the inner supporting part, which has a depression in the circumferential direction in the region of the restrictor channel.

In the case of a hydraulic support known from German Patent Document DE 41 06 451 A1, three hydraulic chambers are formed between an outer supporting part designed as a cylindrical sleeve and an inner supporting part likewise designed as a cylindrical sleeve, the hydraulic chambers being arranged within an elastomer body arranged between the supporting parts. Of these hydraulic chambers, two are provided radially to the outside and one within an annular part embedded in the elastomer body, the two chambers arranged outside the annular part being separated from one another by a thin membrane, while the two other chambers are connected to one another via a restrictor section which passes through the elastomer body.

An object of the invention is to provide a new design for a hydraulic support of the type stated at the outset, which design can be implemented economically.

According to the invention, this object is achieved by providing an arrangement wherein the elastomer body has embedded in it or vulcanized into it near to its outer circumference a reinforcing sleeve which is surrounded in leaktight fashion by the outer supporting part, which rests on an elastomer layer at the outside of the reinforcing sleeve, exerting pressure on it, wherein apertures in the reinforcing sleeve and recesses open to the apertures in the elastomer body are provided for the chambers, and wherein the restrictor sections are formed as a transverse hole in the inner supporting part and as channels running between the outer supporting part and the reinforcing sleeve in beads of the outer supporting part.

The invention is based on the general idea of reinforcing the outer supporting part, which can be constructed in a manner which is fundamentally known as a sheet-metal part, by means of a reinforcing sleeve embedded in the radially outer region of the elastomer body, making it possible without further measures to achieve the same mechanical loadability as with the inner supporting part, typically designed as a solid part. This simultaneously achieves the advantage that restrictor sections running between the outer supporting part and the reinforcing sleeve can be readily produced by deformation of the sheet-metal material of the outer supporting part and hence at an easily accessible location and that they are arranged between rigid parts. The transverse hole optionally provided as a restrictor section in the inner supporting part remains readily accessible until the outer supporting part is fitted since the mouths of this transverse hole, which are arranged in the associated hydraulic chambers, are freely accessible via the apertures present in the reinforcing sleeve in the region of the hydraulic chambers.

According to a particularly preferred embodiment of the invention, it is envisaged that the inner supporting part should have a region with an essentially cylindrical—or slightly tapered—outer circumference and a region with an outer circumference which has a pronounced taper, and that the outer supporting part should have regions with a cylindrical—or slightly tapered—and conical inner circumference which are spaced apart from the said outer supporting part by the elastomer spring arrangement.

Other objects, advantages and novel features of the present invention will become apparent from the following detailed description of the invention when considered in conjunction with the accompanying drawings.

DETAILED DESCRIPTION OF THE INVENTION

Figure 1:
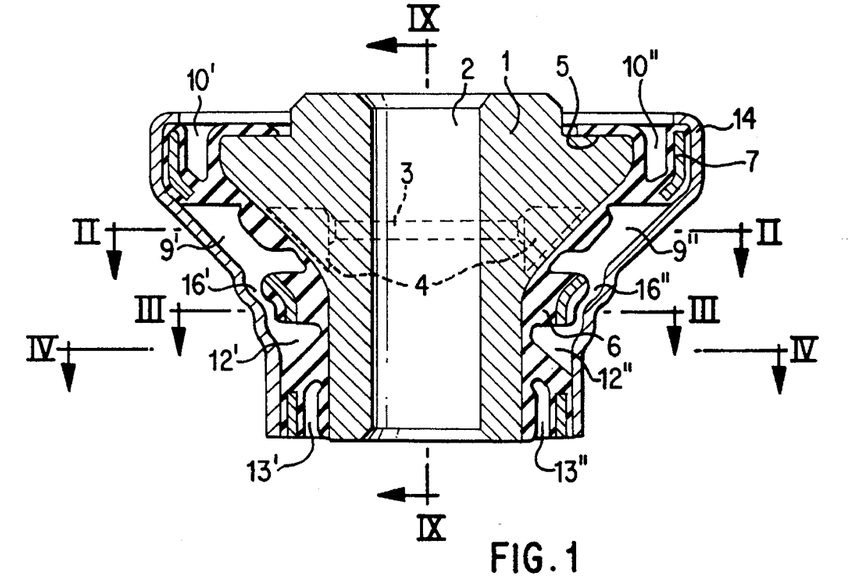
FIG. 1 shows an axial section of a hydraulic support according to a preferred embodiment of the invention.
Figure 2:
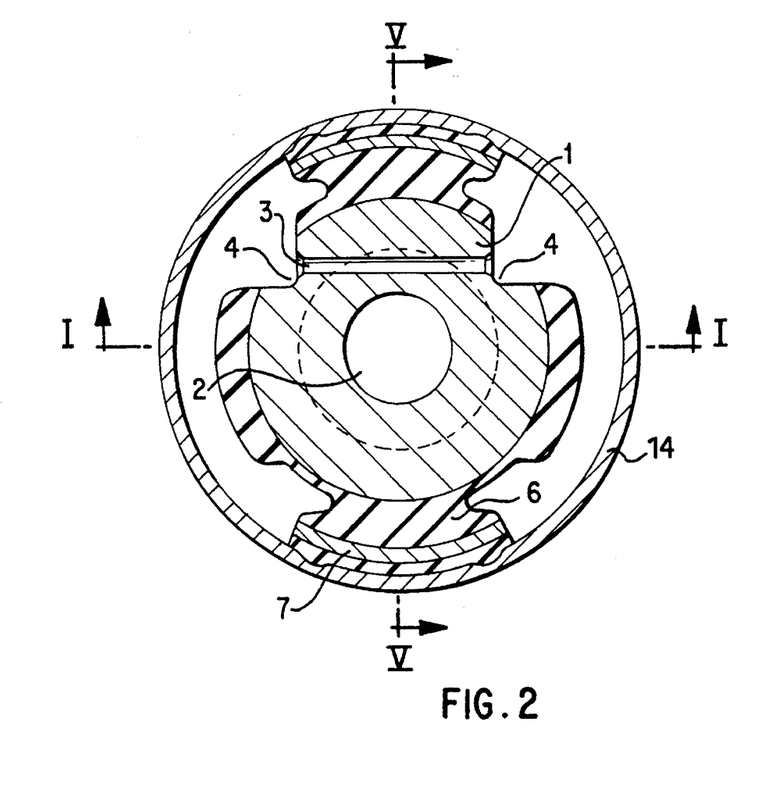
FIG. 2 shows a radial section of the support along section line II—II in FIG. 1, section line I—I in FIG. 2 representing the section plane of FIG. 1.
Figure 3:
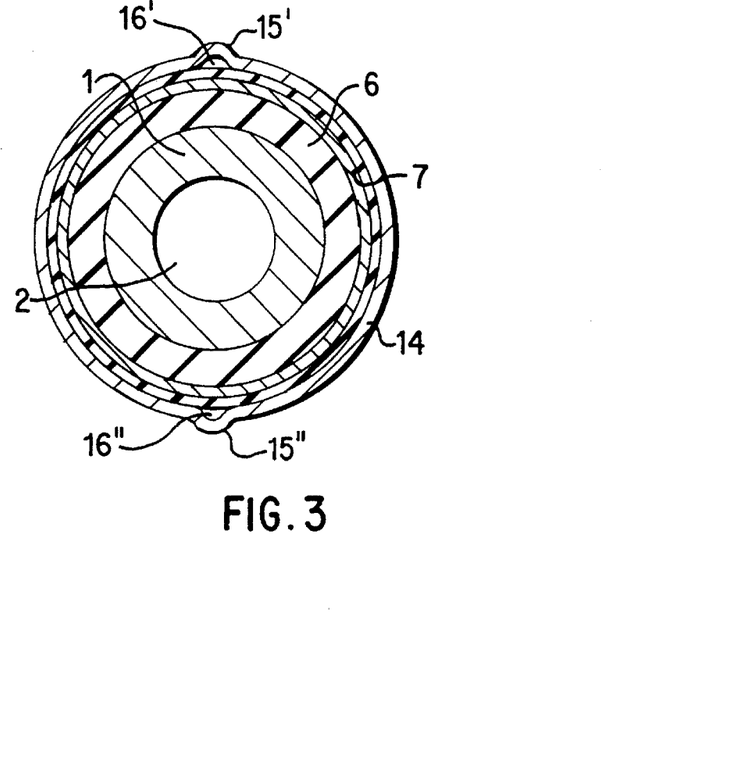
FIG. 3 shows a radial section in accordance with section line III—III in FIG. 1.
Figure 4:
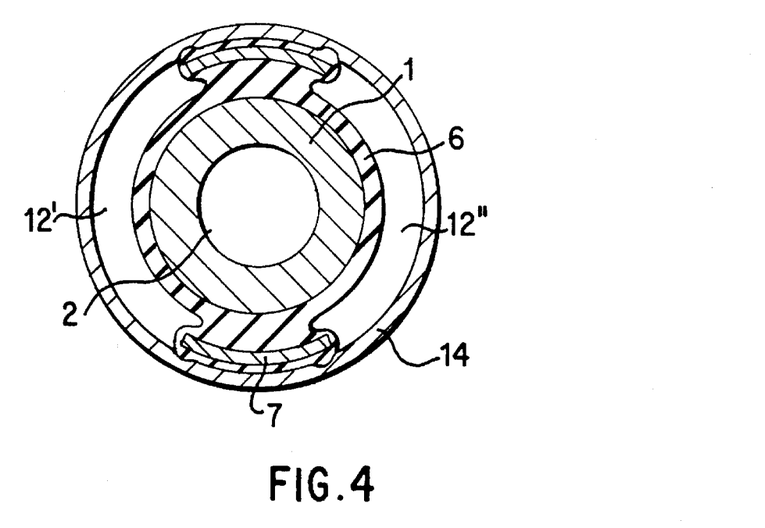
FIG. 4 shows a radial section in accordance with section line IV—IV in FIG. 1.

The hydraulic support shown has an inner supporting part 1, which is constructed in the manner of a sturdy and compact metal sleeve of circular cross-section and has an axial hole 2 to accommodate a fastening bolt or the like of a machine part to be connected to the supporting part 1. That half of the inner supporting part 1 which is at the bottom in FIG. 1 has an essentially cylindrical outer circumference, while the upper half adjoins the cylindrical circumferential surface with an outer circumference which has a pronounced taper, the cross-section of the inner supporting part 1 widening upwards in FIG. 1. Arranged in the region of the tapered outer circumference, eccentrically with respect to the axial hole 2 in the inner supporting part 1, is a transverse hole 3, the mouths of which lie within recesses 4 in the tapered outer circumferential surface of the inner supporting part 1. Formed on that end of the inner supporting part 1 which is at the top in FIG. 1 there is an annular step, such that the radially outer area 5 of this end face is set back towards the bottom in FIG. 1 relative to the radially inner area, which adjoins the upper mouth of the axial hole 2.

Figure 5:
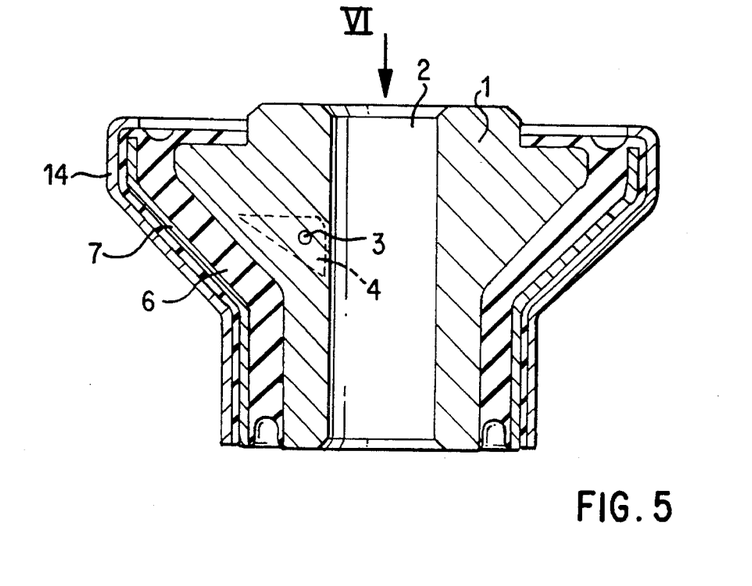
FIG. 5 shows an axial section in accordance with section line V—V in FIG. 2.

The inner supporting part 1 is surrounded at its circumference by the elastomer body 6 of an elastomer spring arrangement. This elastomer body 6 is vulcanized by its inner circumferential side to the outer circumferential side of the inner supporting part 1. The elastomer body 6 also overlaps the radially outer area 5 of that end of the inner supporting part 1 which is at the top in FIGS. 1 and 5, the elastomer material also being vulcanized to area 5 of the supporting part 1. Vulcanized into the elastomer body in the vicinity of its outer circumference is a metallic reinforcing sleeve 7, the diameter of which is markedly greater at all points than the diameter of the inner supporting part 1 and the shape of which very largely resembles the shape of the outer circumferential surface of the inner supporting part 1. Accordingly, the reinforcing sleeve 7 in accordance with FIGS. 1 and 5 has a lower cylindrical region, a funnel-shaped region which adjoins the first-mentioned region towards the top and widens upwards, and a short cylindrical region of large diameter which adjoins the latter region towards the top.

Figure 6:
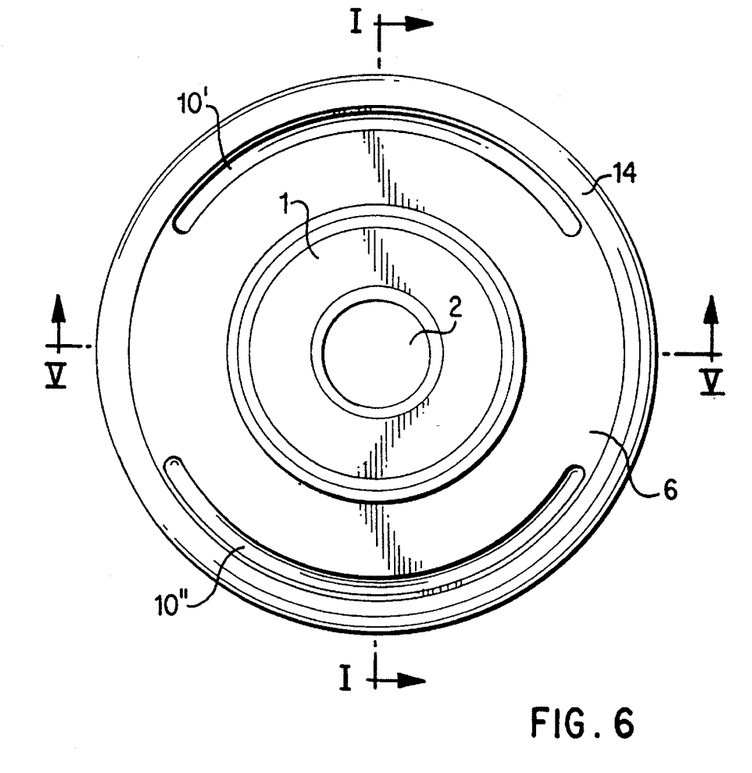
FIG. 6 shows an end view in accordance with arrow VI in FIG. 5.
Figure 7:
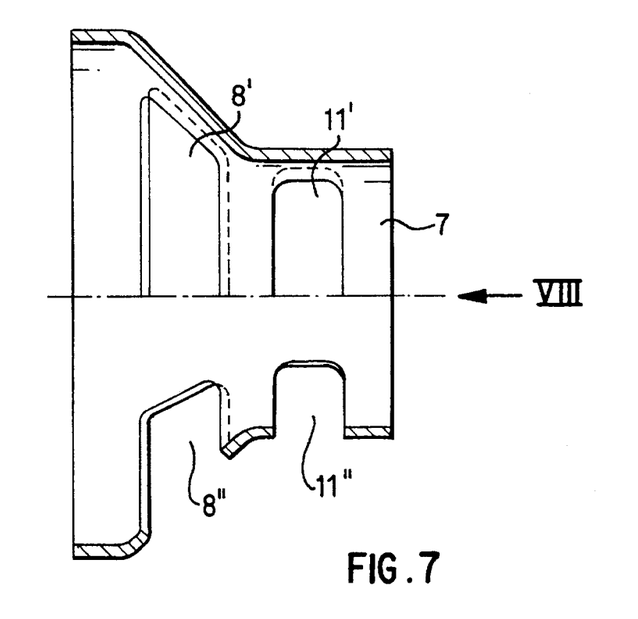
FIG. 7 shows an axial section of a reinforcing part vulcanized into the elastomer spring arrangement.
Figure 8:
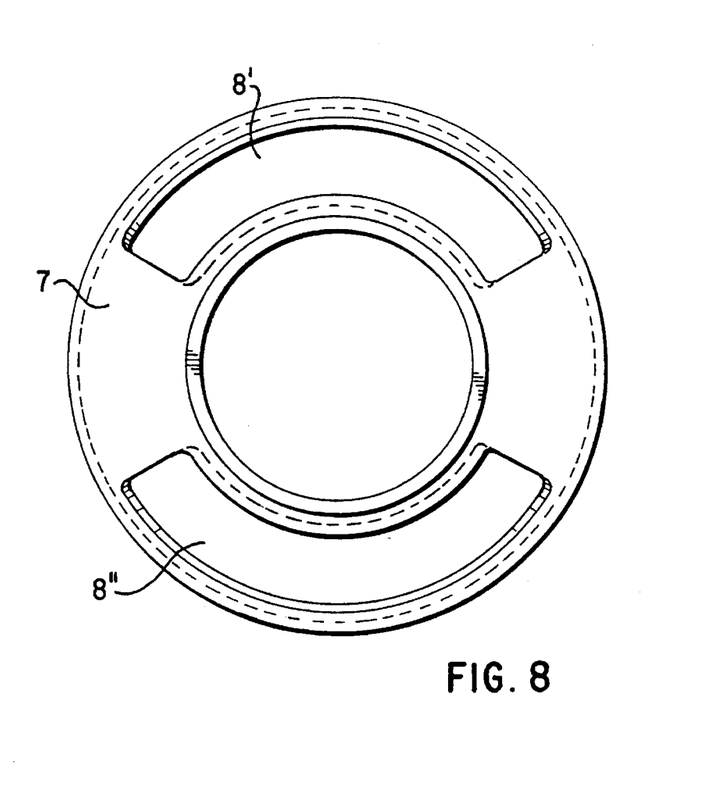
FIG. 8 shows an end view of this reinforcing part in accordance with arrow VIII in FIG. 7.
Figure 9:
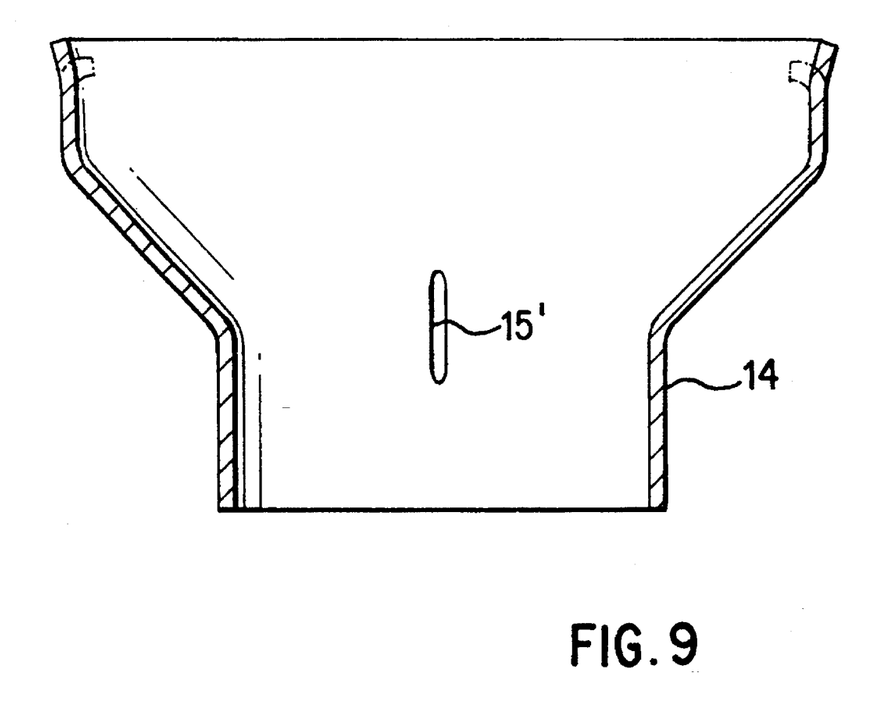
FIG. 9 shows an axial section of the outer supporting part in accordance with section line IX—IX in FIG. 1.

In the funnel-shaped region, the reinforcing sleeve 7 has two large apertures 8' and 8" extending in the circumferential direction, these apertures being arranged in such a way in the circumferential direction that each of the mouths of the transverse hole 3 in the inner supporting part 1 is associated with one of the apertures 8' and 8". In the region of the apertures 8' and 8", the elastomer body 6 is recessed to form two chambers 9' and 9" which communicate with one another via the transverse hole 3 in the supporting part 1. In the region of these chambers 9' and 9", the elastomer body 6 has, at its upper end in FIG. 1, two deep end pockets 10' and 10", cf. FIGS. 1 and 6, with the result that the walls of the chambers 9' and 9" are correspondingly thin and flexible at these points.

Within the cylindrical region with the small diameter, the reinforcing sleeve 7 has two further apertures 11' and 11", each being situated in the same sectors as the above-mentioned apertures 8' and 8" in the axial view of the reinforcing sleeve 7. Below these apertures 11' and 11", the elastomer body 6 is again recessed to form two further chambers 12' and 12". In the region of these chambers 12' and 12", the elastomer body 6 has, in its lower end region in FIG. 1, two deep end pockets 13' and 13", with the result that the corresponding walls of the chambers 12' and 12" are correspondingly thin and flexible.

At its outer circumference, the reinforcing sleeve 7 is surrounded in leaktight fashion by a sleeve shaped outer supporting part 14 which rests on an elastomer layer which is arranged to the outside of the reinforcing sleeve 7 and can be designed as part of the elastomer body 6, the supporting part exerting pressure on the elastomer layer. At its top end rim in FIGS. 1 and 5, the outer supporting part 14 is rolled over and thus surrounds the adjacent end rim of the reinforcing sleeve 7 in leaktight fashion.

By means of the outer supporting part 14, the chambers 9' and 9" and 12' and 12" are closed off radially towards the outside.

Axial beads 15' and 15" are formed in the outer supporting part 14 between apertures 8' and 11', on the one hand, and apertures 8" and 11", on the other, with the result that there are two channels 16' and 16" between the outer supporting part 14 and the reinforcing sleeve 7 via which chambers 9' and 12', on the one hand, and chambers 9" and 12", on the other, communicate with one another.

Chambers 9' and 9" chambers 12' and 12", the transverse hole 3 and channels 16' and 16" are filled with hydraulic medium.

The hydraulic support illustrated functions as follows:

The supporting parts 1 and 14 are each connected in a manner which is fundamentally known to machine parts or the like which are supported against one another and, by virtue of the flexibility of the elastomer body 6, can perform movements or vibrations relative to one another in the same way as the supporting parts 1 and 14.

Insofar as the supporting parts 1 and 14 are moved relative to one another in the axial direction, hydraulic medium is on the one hand exchanged between chambers 9' and 12' via channel 16' and on the other hand between chambers 9" and 12" via channel 16". In the case of radial movements between the supporting parts 1 and 14, hydraulic medium can be exchanged between chambers 9' and 9" via the transverse hole 3 and/or, in the same way as with axial movements, between chambers 9' and 12' and 9" and 12". The exchange of hydraulic medium between chambers 9' and 12' and 9" and 12", particularly in the case of axial movements of the supporting parts 1 and 14 relative to one another, is promoted if chambers 9' and 9" have a markedly different volume stiffness from chambers 12' and 12", i.e. if changes in the hydraulic pressure lead to different volume changes in the chambers, because, for example, the position of the chambers or the arrangement or thickness of the walls of elastomer material enclosing the chambers is different.

The lengths and cross-sections of the transverse hole 3 and of channels 16' and 16" are preferably differently dimensioned, such that damping maxima occur at different frequencies of vibrational movements between the supporting parts 1 and 14.

The length and cross-section of the transverse hole 3 can, for example, be dimensioned such that a damping maximum occurs at about 12 Hz in the case of radial vibrations between the supporting parts 1 and 14. Channels 16' and 16" can be designed in such a way that a damping maximum occurs at about 33 Hz in the case of axial vibrations between the supporting parts 1 and 14. If radial vibrations with a frequency significantly above 12 Hz are excited, the transverse hole 3 can admittedly be regarded as "hydraulically closed". However, an exchange of hydraulic medium does take place between chambers 9' and 12', on the one hand, and chambers 9" and 12", on the other, even in the case of radial vibrations, and there is thus a further damping maximum (secondary maximum) at about 33 Hz.

Figure 10:
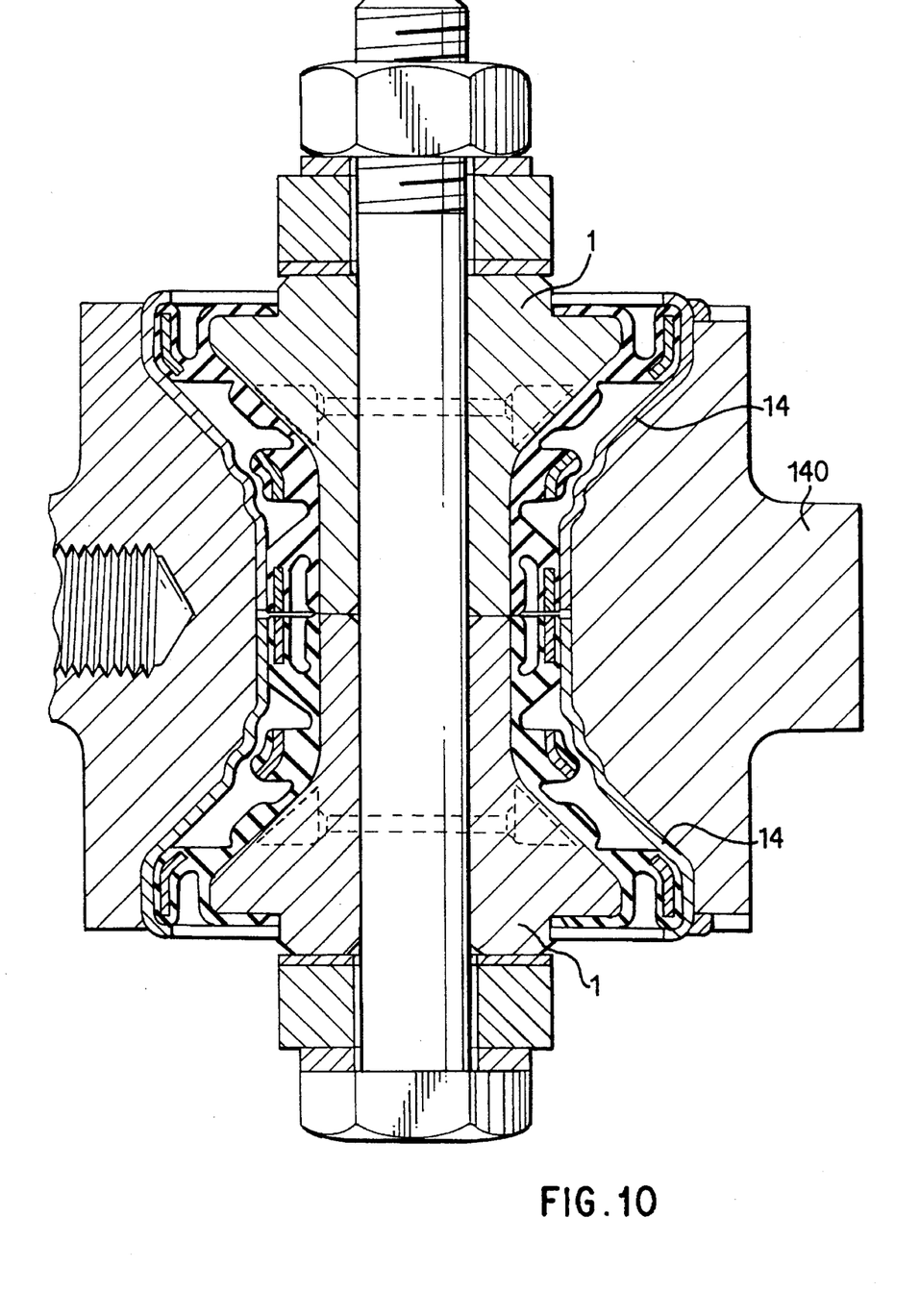
FIG. 10 shows an axial section of a twin arrangement of the hydraulic support.

As shown in FIG. 10, a twin arrangement of the hydraulic support explained above can also be provided the inner supporting parts 1 of two hydraulic supports being connected to one another by a bolt or the like which can simultaneously serve to hold machine part or the like, such that the smaller-diameter ends of the two inner supporting parts 1 are clamped together. The two supporting parts 14 of the two hydraulic supports are accommodated with a form fit in a sleeve 140 which can likewise be connected to machine parts or the like.

What is claimed is:

1. Hydraulic support in the form of a hydraulically damped elastomer support with an inner supporting part and an outer supporting part, concentric with the latter, and an annular elastomer body which is arranged as a spring between these supporting parts and in which there are formed hydraulic chambers which communicate with one another via hydraulic restrictor sections and between which hydraulic medium is exchanged when the supporting parts move relative to one another in the axial or radial direction, there being at least two groups of chambers which are spaced apart in the circumferential direction of the supporting parts and which each have at least two chambers situated adjacent to one another in the axial direction, the restrictor sections connecting the chambers of each group to one another and in each case connecting one chamber of each group to the corresponding chamber of another group, wherein the elastomer body has embedded in it or vulcanized into it near to its outer circumference a reinforcing sleeve which is surrounded in leaktight fashion by the outer supporting part, which rests on an elastomer layer at the outside of the reinforcing sleeve, exerting pressure on it, wherein apertures in the reinforcing sleeve and recesses open to the apertures in the elastomer body are provided for the chambers, and wherein the restrictor sections are formed as a transverse hole in the inner supporting part and as channels running between the outer supporting part and the reinforcing sleeve in beads of the outer supporting part.

2. Hydraulic support according to claim 1, wherein sections of the outer wall of the inner supporting part and sections of the inner wall of the outer supporting part surround the first chambers of the groups of chambers over a certain area both in the axial and in the radial direction.

3. Hydraulic support according to claim 2, wherein the inner supporting part has a region with an essentially cylindrical outer circumference and a region with an outer circumference which has a pronounced taper, and wherein the outer supporting part has regions with a cylindrical or tapered inner circumference which are spaced apart from the outer supporting part by the elastomer body.

4. Hydraulic support according to claim 3, wherein each group of chambers has at least one chamber between the tapered circumferential surfaces and one chamber between the cylindrical circumferential surfaces.

5. Hydraulic support according to claim 4, wherein each group of chambers has chambers of different size.

6. Hydraulic support according to claim 5, wherein the restrictor sections connecting the chambers of different groups of chambers are dimensioned in such a way that vibrations between the supporting parts in the radial direction are more strongly damped at a first frequency, the first frequency lying below a second frequency at which vibrations in the axial direction are more strongly damped.

7. Hydraulic support according to claim 6, wherein each group of chambers has chambers of different volume stiffness.

8. Hydraulic support according to claim 6, wherein a twin arrangement is provided in which two hydraulic supports are arranged coaxially with respect to one another in such a way that two similar ends of the hydraulic supports face one another.

9. Hydraulic support according to claim 3, wherein each group of chambers has chambers of different size.

10. Hydraulic support according to claim 3, wherein the restrictor sections connecting the chambers of different groups of chambers are dimensioned in such a way that vibrations between the supporting parts in the radial direction are more strongly damped at a first frequency, the first frequency lying below a second frequency at which vibrations in the axial direction are more strongly damped.

11. Hydraulic support according to claim 3, wherein the restrictor sections connecting the chambers of different groups of chambers are dimensioned in such a way that vibrations between the supporting parts in the radial direction are more strongly damped at a first frequency, the first frequency lying below a second frequency at which vibrations in the axial direction are more strongly damped.

12. Hydraulic support according to claim 1, wherein each group of chambers has chambers of different size.

13. Hydraulic support according to claim 12, wherein the restrictor sections connecting the chambers of different groups of chambers are dimensioned in such a way that vibrations between the supporting parts in the radial direction are more strongly damped at a first frequency, the first frequency lying below a second frequency at which vibrations in the axial direction are more strongly damped.

14. Hydraulic support according to claim 12, wherein each group of chambers has chambers of different volume stiffness.

15. Hydraulic support according to claim 1, wherein the restrictor sections connecting the chambers of different groups of chambers are dimensioned in such a way that vibrations between the supporting parts in the radial direction are more strongly damped at a first frequency, the first frequency lying below a second frequency at which vibrations in the axial direction are more strongly damped.

16. Hydraulic support according to claim 15, wherein a twin arrangement is provided in which two hydraulic supports are arranged coaxially with respect to one another in such a way that two similar ends of the hydraulic supports face one another.

17. Hydraulic support according to claim 1, wherein each group of chambers has chambers of different volume stiffness.

18. Hydraulic support according to claim 17, wherein a twin arrangement is provided in which two hydraulic supports are arranged coaxially with respect to one another in such a way that two similar ends of the hydraulic supports face one another.

19. Hydraulic support according to claim 1, wherein a twin arrangement is provided in which two hydraulic supports are arranged coaxially with respect to one another in such a way that two similar ends of the hydraulic supports face one another.

* * * * *